United States Patent [19]
Siefert

[11] 3,869,335
[45] Mar. 4, 1975

[54] IMPACT RESISTANT INORGANIC COMPOSITES

[76] Inventor: August C. Siefert, Goose Ln., Granville, Ohio 43023

[22] Filed: Aug. 9, 1972

[21] Appl. No.: 278,905

Related U.S. Application Data

[60] Division of Ser. No. 120,932, March 4, 1971, Pat. No. 3,702,240, which is a continuation-in-part of Ser. No. 820,015, April 28, 1969, abandoned.

[52] U.S. Cl................ 161/143, 65/3, 65/4, 65/33, 117/70 A, 117/71 R, 117/126 GM, 161/165, 161/170, 161/175, 161/196, 161/404, 161/411
[51] Int. Cl................ B32b 17/04, C03c 23/20
[58] Field of Search ........... 161/143, 170, 175, 176, 161/196, 165, 404, 411; 117/70 A, 71 R, 126 GM; 65/3, 4, 33

[56] References Cited
UNITED STATES PATENTS

| | | | |
|---|---|---|---|
| 2,693,668 | 11/1954 | Slayter................ | 161/170 |
| 2,900,274 | 8/1959 | Whitehurst............ | 117/126 GM |
| 2,940,886 | 6/1960 | Nachtman............. | 117/126 GM |
| 2,976,177 | 3/1961 | Warthen.............. | 117/114 C |
| 3,019,515 | 2/1962 | Whitehurst et al..... | 117/126 GM |
| 3,575,789 | 4/1971 | Siefert et al......... | 161/170 |
| 3,681,187 | 8/1972 | Bowen et al.......... | 161/170 |
| 3,758,329 | 9/1973 | Garick................ | 117/126 GM |

*Primary Examiner*—George F. Lesmes
*Assistant Examiner*—Charles E. Lipsey
*Attorney, Agent, or Firm*—Carl G. Staelin; John W. Overman; William P. Hickey

[57] ABSTRACT

An impact resistant composite consisting essentially of metal coated glass fibers in a matrix of glass or ceramics.

9 Claims, 1 Drawing Figure

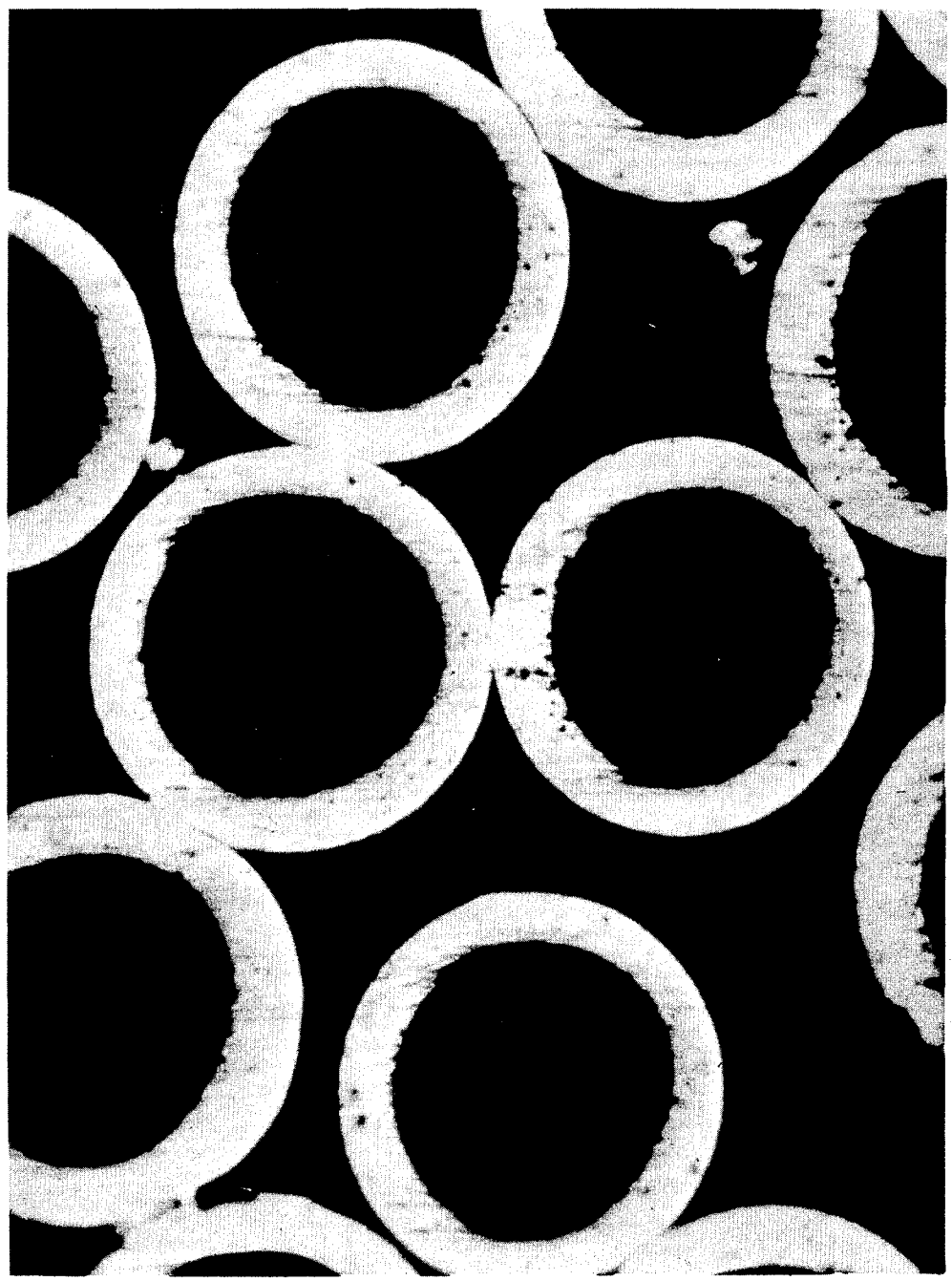

IMPACT RESISTANT INORGANIC COMPOSITES

CROSS REFERENCE TO RELATED APPLICATION

This is a division of application Ser. No. 120,932, filed Mar. 4, 1971, now U.S. Pat. No. 3,702,240, which in turn is a continuation in part of copending application Ser. No. 820,015 filed Apr. 28, 1969, and now abandoned.

BACKGROUND OF THE INVENTION

Glasses and ceramics, even though strong in compression are deficient as structural materials because they are subject to catastrophic failure when placed under tension, particularly when notched. Attempts have been made to reinforce glasses and ceramics with fibers of metals, graphite, etc., as for example metal wire reinforced window glass. These attempts, however, have not changed the basic behavior of the glass or ceramic. The prior art fiber reinforced glasses and ceramics are brittle in nature, and cannot be bent or impacted without propagating a crack across a large part of the article.

SUMMARY OF THE INVENTION

It has been found that a composite comprising glass fibers and a glass or ceramic matrix can be formed which will not undergo catastrophic failure provided the fibers are generally parallelly oriented and a thin layer of a material, such as a metal that does not fuse with the matrix, is interpositioned between the glass fibers and the matrix. This combination can be made in various ways, the most convenient of which involves the step of coating the glass fibers with a thin coating of a metal prior to being incorporated in the matrix material. In some instances, the metal coating on the fibers may be oxidized during processing, and in these instances, the metal coated glass fibers are preferably sheathed in a thin coating of glass prior to incorporation in the glass matrix forming material. The glass sheathing which surrounds the metal coating on the fibers prevents oxidation during fusion of the matrix forming material to insure the presence of the metal in the heat integrated composite. It has been found that the glass sheathing can be very thin and still prevent excessive oxidation of the metal coating, and that a low melting point glass can be used for the sheathing without materially affecting the strength of the composite. The glass sheathing in some instances may retain its identity in the composite, and in either instances it may diffuse into the matrix without materially reducing the melting temperature of the matrix of otherwise changing desirable properties of the matrix. It has been found, that while some metal coatings must be protected by the glass sheathing, coating of other metals can be incorporated into a glass matrix without sheathing. The glass fiber ceramic matrix composites of the invention do not undergo catastrophic failure when subjected to sharp blows which would shatter or break any known bulk glass material. What is more, many of the embodiments can be deformed with a ball-peen hammer. Although the fibers and the matrix may fracture slightly at the point of impact the fractures do not propagate and are confined to a small localized portion of the article. Thus the entire article does not break. Still other embodiments of the invention, have moduli which do not decrease appreciably and in some instances actually increase with increasing temperatures, whereas the moduli of metals decrease rapidly at elevated temperatures. In addition, the composites of the present invention are of light weight, since glass has a density of approximately 2.2, so that the composites of the present invention have a higher strength to weight ratio, particularly at temperatures at which aluminum and other metals lose strength rapidly.

The principal object of the present invention is the provision of a new and improved light weight, high strength composite comprising a glass matrix reinforced with glass fibers and which will not undergo catastrophic failure when subjected to shock.

A further object of the invention is the provision of a new and improved process of making ceramic composites reinforced by metal coated glass fibers, and the metal coatings of which are protected from oxidation either from the glass, or from the atmosphere.

Further objects and advantages of the invention will become apparent to those skilled in the art to which it relates from the following descriptions of several preferred embodiments hereinafter described.

BRIEF DESCRIPTION OF THE DRAWINGS

The solitary FIGURE of the drawing is a photomicrograph of a cross section of the composite of Example 1.

DESCRIPTION OF THE PREFERRED EMBODIMENTS

EXAMPLE 1

Silica fibers 0.004 inch in diameter were made by feeding a 4 millimeter diameter fused silica rod of 99.9 percent purity into an oxygen acetylene flame. The molten silica produced by the flame is drawn downwardly at a rate of 1,000 feet per minute through a slot in a metal coating applicator tube containing a ¼ inch depth of molten metal, then past a nitrogen quenching jet and is then wrapped upon a winding drum. The molten metal that is fed to the drawn silica fiber comprises 99.99 percent aluminum and 0.01 percent bismuth, and is fed to the fiber at approximately 5 percent above its melting point. The molten metal is fed to the fused silica fiber through an alundum tube having a 0.064 I.D. chamber and which is slotted to allow the fiber when positioned in the slot to pass through molten metal in the chamber. The finished coated fiber has a diameter of 0.0055 inches, and a traverse mechanism causes the fibers to be bound uniformly upon the drum. The fibers so produced have a tensile strength of 813,000 pounds per square inch based on the silica fiber diameter. The aluminum coating was 0.00075 inch thick.

The aluminum coated silica fibers produced as above described are processed into a glass matrix composite by pulling a bundle of the coated fibers through a molten glass bath into a carbon tube. The molten glass bath was maintained at 950°F and had the following composition by weight: $SiO_2$, 4.0; $Al_2O_3$, 3.0; $B_2O_3$, 10.0; PbO, 83.0. The fibers were drawn into the tube for approximately a 4 inch length. After being pulled into the tube, the tube was allowed to cool to room temperature, and the outer carbon tube was broken away to leave a rod 0.25 inch in diameter and 4 inches long. The rod had a 60 percent by volume loading of the aluminum coated silica fibers distributed uniformly in a generally parallel arrangement throughout 40 percent by volume of the lead glass. The rod had an overall glass content of 80 percent by volume, an aluminum content of 20 percent by volume, and had a flexural strength of 80,000 pounds per square inch. A specimen when notched had a flexural strength of 66,500 pounds per square inch. The rod is surprisingly ductile, and is permanently deformed during bending. The rods do not undergo catastrophic failure, which is surprising for a glass fiber reinforced glass material. When in the form of a glass, the material has a Youngs Modulus of $8.0 \times 10^6$ pounds per square inch, a density of 6.1 grams per cubic centimeter, a softening point of 400°C, and a coefficient of thermal expansion of $80 \times 10^{-7}$/°C. When the material is held at a temperature of 1,000°F for approximately one hour, it undergoes devitrification, and its softening point and strength at high temperature increase significantly. The solitary figure of the drawing is a photomicrograph of a cross section of the rod produced as above described.

The photomicrograph clearly shows enlarged sections of glass matrix material spaced from other enlarged sections of matrix material by thin interconnecting sections of matrix material which pass between the metal coatings of adjacent fibers. The exact reason for the apparent ductility and lack of catastrophic failure is not known, but it is believed that crack propagation, as by shock wave, is stopped by the absorption of the shock waves by the resilient metal coatings which bound the thin connecting portions of the matrix glass. The groupings of fibers therefore prevent cracks from propagating throughout the composite, and the cracks, are limited to the enlarged sections. Cracks in the enlarged sections are staggered relative to each other. The bond strength of the matrix glass with the metal coatings is so great that shear from one enlarged section of matrix glass that is located between cracks is transferred onto the fibers and then back onto the matrix glass on the opposite side of a crack. The above explanation is believed to account for the ductility and lack of catastrophic failure which the composites of the invention exhibit.

EXAMPLE 2

A composite is produced using the aluminum coated fibers of Example 1 by fusion of a minus 100 mesh powdered glass having the following composition around the fibers: $SiO_2$, 28.7%; $Na_2O$, 11.7%; $CaO$, 9.1%; $BaO$, 17.2%; $B_2O_3$, 26.3%; $ZnO$, 5.3%; and $F_2$, 3.1%. Twenty percent of the aluminum coated silica fibers are mixed with 50 percent by weight of the powdered glass with the fibers being oriented in a generally parallel manner. The mixture is placed between two sheets of stainless steel foil, the edges of which are bent over to form an envelope. The envelope is then placed in a furnace and heated to 1,150°F while subjected to a pressure of approximately 15 psi. The composite produced has substantially the same properties at room temperature as that given in Example 1, and the rod is surprisingly ductile, and undergoes permanent deformation, when bent.

EXAMPLE 3

A composite is produced using the aluminum coated fibers of Example 1 and having combined therewith fibers having the following composition: $SiO_2$, 28.7%; $Na_2O$, 11.7%; $CaO$, 9.1%; $BaO$, 17.2%; $B_2O_3$, 26.3%; $ZnO$, 5.3%; and $F_2$, 3.1%. Twenty percent of the aluminum coated silica fibers are mixed with 50 percent by weight of glass fibers with the fibers being oriented in a generally parallel manner. This mixture of fibers is placed between two sheets of stainless steel foil, the edges of which are bent over to form an envelope. The envelope is heated to 1,150°F while subjected to a pressure of about 15 psi. The glass fibers fuse about the aluminum coated silica fibers to form a composite having the same room temperature properties as that given in Example 1.

EXAMPLE 4

An aluminum coated fiber of Example 1 is fed downwardly through a glass tube having an internal diameter of 4 millimeters and an outside diameter of 6 millimeters. The bottom ⅛ inch of the tube is fused by an oxygen-acetylene flame around the aluminum coated silica fiber, and the aluminum coated silica fiber in the fused glass envelope is pulled downwardly through air and wrapped around a drum. During passage through the air, the fused glass coating solidifies into a surface coating of approximately 0.001 inch thick. The glass tubes and coating have the same composition as the matrix glass of Example 2. The double coated silica fibers thus produced are grouped together in a generally parallel manner and placed between two sheets of stainless steel foil. The stainless steel envelope thus formed with its contents are placed in a furnace and heated to 1,150°F under a pressure of approximately 15 pounds per square inch. At this temperature, the glass coating fuses together to form a composite having the properties of that produced in Example 2.

EXAMPLE 5

Glass fibers of 0.004 inch in diameter are produced from small streams of molten glass that are allowed to flow through openings in the bottom of a glass melter, and which streams are attenuated and wrapped upon a winding drum. The glass has the following composition by weight: $SiO_2$, 65; $Al_2O_3$, 24.7; $Na_2O$, 0.3; $MgO$, 10. This glass has a softening point of approximately 1,800°F. The fibers after solidification are coated with aluminum using the procedure given in U.S. Pat. No. 2,976,177. The aluminum coated glass fibers thus produced are then given a coating of a glass using the procedure given in Example 4. The glass coated, aluminum coated glass fibers thus produced are formed into a composite using the procedure of Example 4, and the composite thus formed has substantially the same properties.

EXAMPLE 6

The process of Example 5 is repeated excepting that the uncoated glass fibers have the following composition by weight: $SiO_2$, 54; $Al_2O_3$, 15; $Na_2O$, 0.5; $TiO_2$ 0.05; $B_2O_3$, 8; $MgO$, 4; $CaO$, 17.7; and $F_2$, 0.3. The glass has a softening point of 1,112°F, and the coated fibers are formed into a composite using the procedure of Example 4, at a composite forming temperature of 1,150°F. The composite so produced has the same general flexural properties as does the composite of Example 4, and is useful at higher temperatures, than is the composite of Example 4.

It will now be apparent that metal coated glass fibers can be used to reinforce matrix materials of glass or other ceramic, and that the metal coating provides a ductile bond between the glass of the fibers and the ceramic of the matrix. When the fibers are generally parallelly oriented, the metal coating prevents crack propagation in the matrix from being transferred through the composites. Any suitable type of glass fibers can be used even though they soften somewhat at the elevated temperatures, and any type of metal coating can be used which will withstand the firing conditions provided that the metal has a melting point above the softening point of the matrix glass. Suitable examples of the metals, and alloys thereof, which can be used are: aluminum, copper, nickel, lead, zinc, tin, magnesium, indium, cadmium, antimony, bismuth, titanium, chromium, molybdenum, zirconium, and iron. The metal can be applied to the fibers from a molten condition provided that the molten metal is solidified quickly and does not remain in contact with the glass fibers or matrix for more than the time that it takes the metal to flow around the fibers, as demonstrated above, or can be applied in any other suitable manner; as for example by vapor deposition, as shown by U.S. Pat. No. 3,019,515; by a chemical coating process, as shown for example in U.S. Pat. No. 2,900,274; or from a metal emulsion as described in U.S. Pat. No. 2,886,479. The amount of metal coating that is necessary on the fibers will vary depending upon the reactivity of the metal with the matrix and/or glass fibers, and in most instances the metal coating will perform its function of providing necessary separation between the fiber and the matrix when its thickness is more than approximately 0.00005 inch. Thicknesses of more than approximately 0.001 inch are not necessary in most instances, and may unnecessarily increase the metal loading of the composite.

In general, glasses having a silica content of more than approximately 50 percent have high tensile strength and generally high melting temperatures and are, therefore, ideally suited for making metal coated glass fiber, glass and/or ceramic composites. Suitable examples include: glasses known in the trade as "S-Glass," "E-Glass," "Pyrex," "Pyroceram," and "Vycor." "S-Glass" has the general composition in percent by weight: 65% $SiO_2$, 25% $Al_2O_3$, and 10% MgO; and "E-Glass" has the following composition in percent by weight; 53% $SiO_2$, 14.8% $Al_2O_3$, 16.8% CaO, 4.4% MgO, 9.5% $B_2O_3$, and miscellaneous non-essential oxides, as for example $F_2$, $TiO_2$, $Na_2O$, and $Fe_2O_3$. "Pyrex" has the following general composition in percent by weight: 80.5% $SiO_2$, 0.20% $Na_2O$, 2.0% $Al_2O_3$, and 12.9% $B_2O_3$. "Pyroceram" has the following general composition in percent by weight: 70.7% $SiO_2$, 0.20% $Na_2O$, 17.8% $Al_2O_3$, 1.4% ZnO, 4.18% $TiO_2$, 3.15% MgO, and 2.38% $Li_2O$. "Vycor" has the following general composition in percent by weight: 96.3% $SiO_2$, 0.4% $Al_2O_3$, and 2.9% $B_2O_3$. A matrix glass which devitrifies, such as the "Pyroceram," or the lead oxide glass given above and containing 83.0% PbO, has the advantage that it can be heated at elevated temperatures to devitrify and produce a glass fiber reinforced ceramic. Metal coated quartz, "S-Glass" or "E-Glass" fibers are particularly useful for reinforcing such devitrifiable materials. Further advantages can be had by sheathing metal coated glass fibers with devitrifiable glass, as for example the lead glass given above, followed by bonding the sheathing together to produce a composite, and devitrifying the sheathing. Still further advantages of the invention can be had by incorporating the abrasive grit material between the metal coated glass fiber reinforcement to produce a totally inorganic reinforced abrasive structure. This can conveniently be done by distributing a grit and a glass powder between glass sheathed metal fibers and fusing the powdered glass around the grit and to the sheathing.

Either the fibers or the matrix material, or both may be devitrified to increase the temperature resistance and modulus of the composite. By proper selection of the composition of the fiber or matrix material followed by proper treatment such as heating, the fiber or matrix can be devitrified.

The reinforcing effect which is achieved by the fibers is generally proportional to the amount of fibers used, and can be as high as 70 percent by volume, but will usually be more than 20 and preferably more than 40 percent.

Composites having a fiber loading of from 20 to 70 percent by volume have the improved properties of the present invention, in that they are generally shatter resistant, and can be deformed without catastrophic failure. Less than 20 percent of the fibers can be used if permanent deformation properties are not desired. Glass matrix compositions which are devitrifiable, usually have their properties further improved by the devitrification process and are, therefore, ideally suited for many applications.

I claim:

1. A strong light-weight composite useful at elevated temperatures and exhibiting apparent ductility comprising: generally parallel glass fibers having a silica content of at least approximately 50 percent by weight, a uniform sheathing of a thickness between 0.00005 and 0.001 inch of a metal from the group consisting of aluminum, copper, nickel, lead, zinc, tin, magnesium, indium, cadmium, antimony, bismuth, titanium, chromium, molybdenum, zirconium, and iron around the individual fibers, said sheathed fibers being bonded together in a glass matrix by a matrix glass of a composition different from that of said fibers and which has a softening point below the melting point of the metal sheathing, said matrix glass being fused to the metal sheathing on the fibers, the glass fibers and metal sheathing occupying from approximately 20 to approximately 70 percent by volume of the composite, and said sheathing effectively isolating the glass of said fibers from said matrix glass to provide a glass composite that is deformable and shatter resistant.

2. A composite of claim 1 wherein the glass fibers have a silica content of above approximately 50 percent.

3. The composite of claim 1 wherein the metal sheathed fibers comprise from approximately 20 to approximately 70 percent by volume of the composite.

4. The composite of claim 1 wherein the matrix glass is devitrified.

5. The composite of claim 1 wherein the fibers are silica fibers.

6. The composite of claim 1 wherein the fibers are E-glass fibers.

7. The composite of claim 1 wherein the fibers are magnesium alumino-silicate fibers.

8. The composite of claim 1 wherein the matrix glass hsa the following approximate composition in parts by weight:

| | |
|---|---|
| $SiO_2$ | 4.0 |

-Continued

| | |
|---|---|
| $Al_2O_3$ | 3.0 |
| $P_2O_3$ | 10.0 |
| PbO | 83.0 |

9. The composite of claim 1 wherein the matrix glass has the following approximate composition in percent by weight:

| | |
|---|---|
| $SiO_2$ | 28.7 |
| $Na_2O$ | 11.7 |
| CaO | 9.1 |
| BaO | 17.2 |
| $B_2O_3$ | 26.3 |
| ZnO | 5.3 |
| $F_2$ | 3.1 |

* * * * *